United States Patent [19]

Shpall

[11] 4,147,903
[45] Apr. 3, 1979

[54] TELEPHONE GUARD

[76] Inventor: Richard T. Shpall, One Wilshire Blvd., Suite 2301, Los Angeles, Calif. 90017

[21] Appl. No.: 848,934

[22] Filed: Nov. 7, 1977

[51] Int. Cl.² .......................................... H04M 1/02
[52] U.S. Cl. .................................... 179/178; 179/161
[58] Field of Search .................. 179/189 R, 178, 161, 179/162, 163, 167; 200/322, 321, 328, 323, 324, 325

[56] References Cited

U.S. PATENT DOCUMENTS

| | | | |
|---|---|---|---|
| 1,077,225 | 10/1913 | Keith | 179/167 |
| 1,610,659 | 12/1926 | Craig | 179/185 |
| 2,518,554 | 8/1950 | Kilby et al. | 179/178 |
| 3,526,730 | 9/1970 | Horton | 179/189 R |
| 3,530,261 | 9/1970 | Guim | 179/185 |
| 3,952,175 | 4/1976 | Golbeck | 200/328 X |

Primary Examiner—Thomas W. Brown

[57] ABSTRACT

A telephone guard for restriction of tampering with the set switch plungers when the handset is removed from the cradle. The guard is attached to the top (9) of the hand carrying recess and has a flexible arm (1) which engages one switch plunger (4), and which has a partial depth hole (7) in the end (3) for restricting movement of the arm until the other plunger is depressed.

1 Claim, 5 Drawing Figures

TELEPHONE GUARD

BACKGROUND OF THE INVENTION

A common nuisance to parents of young children is that children seem to have a special attraction for telephones and enjoy removing the receiver from the cradle and fingering the dial. Such play can prevent incoming calls from being received, can lead to the disruption of calls in progress if the child plays with an extension phone, or can result in the child inadvertently completing a call which could be costly.

The prior art discloses that several attempts have been made to deal with this problem. Some of these devices require a lock and key and thus are expensive. Others are rather complex and are expensive to construct. Others do not automatically engage themselves at the conclusion of a call. If the telephone user fails to re-engage the device, the function of the device is defeated. Furthermore, the functioning of most of the devices disclosed in the prior art is dependent upon the physical dimensions of certain features of the telephone being within a close tolerance of the dimensions of the device. An examination of the so-called "standard desk telephones" reveals that certain features are altered from model to model. Examples of dimensions which are frequently altered and which would affect the operation of telephone guards described in the prior art are the width of the cradle, the depth of the hand carrying recess and the overall height of the housing. Thus in practice, it would be very difficult to produce a single model of these prior devices for widespread use.

OBJECTS OF THE INVENTION

The primary object of this invention is to provide a telephone guard for a telephone which will maintain the switch plunger of a telephone depressed when the handset is removed from the cradle.

Another object is to provide a telephone guard whose usefulness is not strongly dependent upon the exact physical dimensions of the telephone features.

Another object is to provide a telephone guard which is of simple design, easy to attach and inexpensive to manufacture.

Another object is to provide a telephone guard which when disengaged to allow telephone use will automatically be re-engaged when the handset is returned to the cradle.

Another object is to provide a telephone guard which is inconspicuous and does not significantly interfere with the use of the hand carrying recess.

Other objects and a fuller understanding of the invention may be had by referring to the following description, the appended claims and the figures of the attached drawings.

DESCRIPTION OF THE PREFERRED EMBODIMENTS

Figure 1:
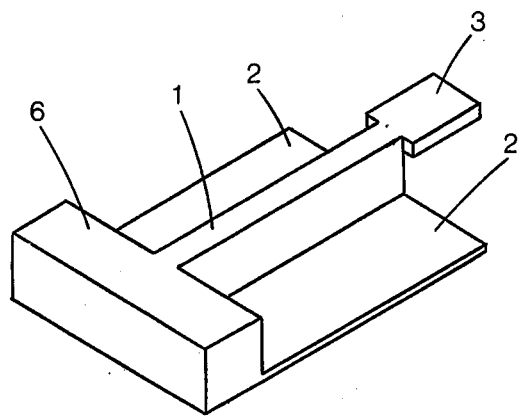
FIG. 1 is an isometric view of a telephone guard incorporating an arm rigidly attached to the guard base and an arm made of a flexible material, said guard being designed for attachment to a desk style telephone with an adhesive.

FIG. 1 shows an isometric view of the telephone guard incorporating an arm rigidly attached to the guard base and an arm made of a flexible material, said guard being designed for attachment to a desk style telephone using an adhesive. One end of the flexible arm (1) is attached to the telephone guard base (2). The other end of the flexible arm (3) is widened beyond the width of the arm shaft to provide coverage of the switch plunger (4). Widening of the end of the arm may not be required if the arm material itself is sufficiently wide to depress the switch plunger and to re-engage the guard when the handset is returned to the cradle. The thickness of the end of the arm (3) is less than the arm shaft (1) to accommodate the bottom rib of the cradle (5). The base is a thin flat plate which when coated with a suitable adhesive substrate provides an anchor to the top of the hand carrying recess adequately strong to accommodate the torque developed when the arm is flexed from its normal position. This figure shows a version of the guard wherein the arm and the base are a singly molded unit. To strengthen the joint between the flexible arm and the flat base, the end portion (6) of the base may be thickened to the partial or full height of the arm as shown. The need for such thickening will be dependent upon the strength of the materials chosen and the type of joint made between the arm and the base. Other means of rigidly attaching an arm to the base are possible.

Figure 2:
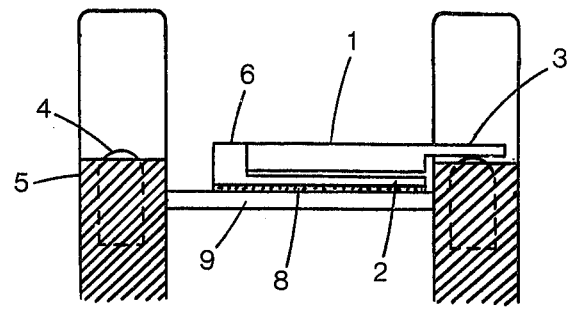
FIG. 2 is a cutaway rear view of a desk type telephone with this telephone guard attached using an adhesive.

FIG. 2 shows a cutaway rear view of the telephone guard installed on a telephone using an adhesive substrate (8) to attach the telephone guard to the top of the hand carrying recess (9). This figure shows the end portion of the arm (3) which fits over the bottom rib of the cradle (5) and which covers the switch plunger (4) maintaining it depressed.

Several types of available adhesives may be used to afix the guard to the top of the hand carrying recess. One type of adhesive substrate which is available and is particularly suitable for this application is a lamination of pressure sensitive adhesive, a thin layer of foam material, and a second layer of pressure sensitive adhesive. This type of adhesive may be attached to the guard during manufacture utilizing the first layer of adhesive. A protective, peelable paper protects the second adhesive layer. To install the guard, the paper is peeled off and the guard pressed on to the hand carrying recess. This type of adhesive is also desirable since the guard may be provided with several unattached thicknesses of the adhesive laminate having peelable paper on both surfaces. The consumer then selects the thickness which best conforms the height of the guard to the height of the bottom rib of the cradle (5), peels off one paper and attaches the adhesive substraight to the guard, then peels off the second paper and installs the guard.

Figure 3:
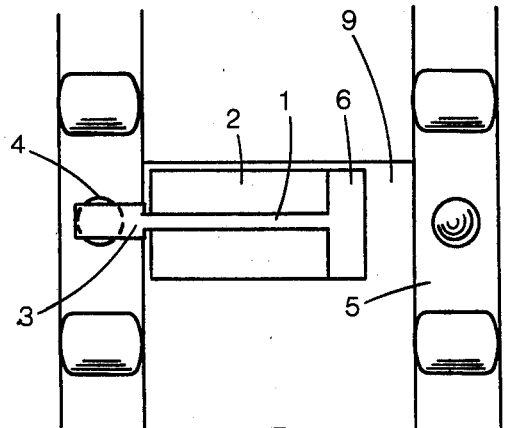
FIG. 3 is a top plan view of a telephone showing the flexible guard arm in its normal position.

FIG. 3 shows a top plan view of the telephone cradle having a telephone guard attached to the top of the roof of the hand carrying recess (9) with an adhesive. The arm (1) is shown rigidly attached to the thickened portion of the base (6). The end portion of the guard arm (3)

and the guard arm (1) are in their normal position covering the switch plunger (4) maintaining it depressed even when the handset is removed from the cradle.

The length and width dimensions of the guard base are smaller than the roof of the hand carrying recess thereby making the guard suitable for use with telephones of varying dimensions.

Figure 4:
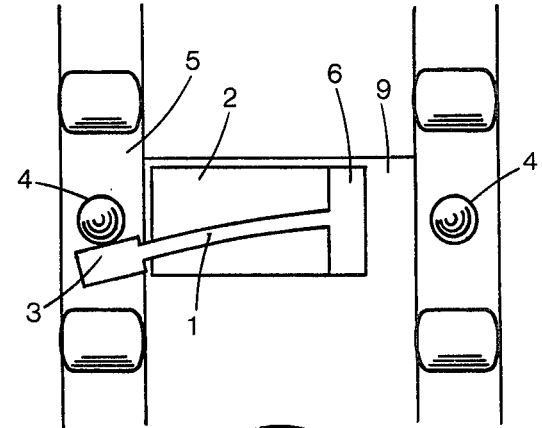
FIG. 4 is a top plan view of a telephone showing the flexible guard arm in its position when the telephone is in use.

FIG. 4 shows a top plan view of the telephone cradle having a telephone guard attached to the top of the roof of the hand carrying recess (9) with an adhesive. The arm (1), constructed from a flexible material, is shown rigidly attached to the thickened portion of the base (6). The end portion of the guard arm (3) and the guard arm (1) appear as they would after the arm has been manually flexed to allow the switch plunger (4) to rise and then released coming to rest against the side of the switch plunger. This is the position of the telephone guard when the telephone is in use for dialing or talking.

Figure 5:
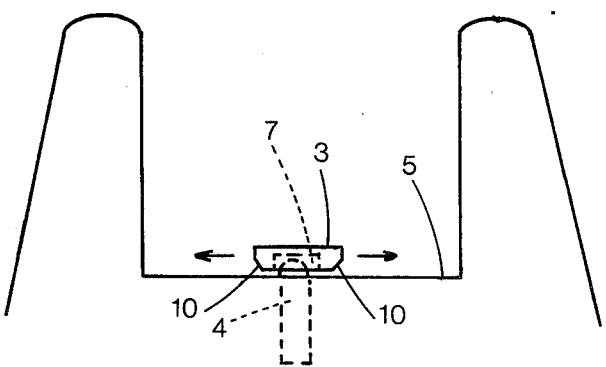
FIG. 5 is a partial end view of the telephone with the version of the telephone guard which incorporates an arm with beveled edges and a partial depth hole.

FIG. 5 shows an end view of the cradle with that version of the guard wherein a partial depth hole (7) has been provided in the end portion of the arm (3) to accommodate a slight rising of the switch plunger (4). The rising is slight enough such that the telephone circuit for receiving incoming calls remains closed. With this design the telephone arm may not be moved laterally until the second plunger has first been manually depressed allowing the switch plunger (4) to be withdrawn from the hole. This design requires additional dexterity and coordination to activate the telephone thus increasing the child-proof characteristic of the guard.

This figure also shows that version of the guard wherein the end portion of the arm (3) which covers the switch plunger has beveled edges to facilitate the automatic re-engagement of the guard when the handset is returned to the cradle. Depending on the specific dimensions of the end of the arm (3) which covers the switch plunger, beveling of the arm may not be required since the top of the switch plunger is already beveled thereby facilitating re-engagement of the guard. The beveled edges may also be provided on versions of the invention not incorporating the partial depth hole.

To use a telephone on which a telephone guard has been installed, the user removes the handset from the cradle and flexes the telephone guard in either direction to allow the switch plunger to rise. The arm of the telephone guard is then released whereby it springs back and comes to rest against the side of the switch plunger. When the user has finished using the telephone, he returns the handset to the cradle thereby pushing the switch plunger down and allowing the flexible arm to ride up and over the beveled switch plunger thereby re-engaging the telephone guard. To use a telephone on which a telephone guard having a partial depth hole is installed, the user removes the handset from the cradle then pushes the second switch plunger, not covered by the guard arm, all the way into the bottom rib of the cradle. This allows the first switch plunger to drop out of the partial depth hole and the user proceeds to flex the arm in either direction as described above. This guard also re-engages when the handset is returned to the cradle.

Although I have described my invention with a certain degree of particularity, it is understood that the present disclosure has been made only by way of example and that numerous changes can be made in the details of construction and the combination and arrangements of parts may be resorted to without departing from the spirit and the scope of the invention as herein claimed.

Among those changes which could be incorporated into the telephone guard design is a mechanical clamp which could be used in lieu of the adhesive to attach the guard rigidly to the roof of the hand carrying recess. Shims could be used to adjust the height of the guard to the height of the bottom rib of the cradle. In lieu of the flexible arm rigidly attached to the base, an arm constructed of a rigid material could be moveably attached by a hinge to the guard base wherein a spring mechanisim is utilized to impart the required spring action to the arm when moved from its normal position.

Additionally, the scope of this invention includes the application of telephone guards with features differing from those described in the attached drawing and for application to telephones of varying designs, wherein said guards are attached to the telephone with an adhesive.

Having thus described my invention, what is claimed as new and desired to be secured by Letters Patent is:

1. A guard for a telephone of the desk type having a housing with a first and second switch controlling plunger mounted moveably therein, a cradle portion of the housing acting to position the handset when resting in the cradle onto the switch plungers causing them to be depressed, thereby rendering the telephone ready for incoming calls, and a hand carrying recess the roof of which forms a portion of the cradle, said telephone guard comprising a base being rigidly attached to the roof of the hand carrying recess, and an arm being attached to the base, said arm which when manually moved from its normal position having spring action tending to return said arm to its normal position, and said arm which when in its normal position covers the first switch plunger thereby preventing it from rising fully even with the handset removed from the cradle thus rendering the telephone ready for incoming calls, said arm which when manually moved laterally from its normal position uncovers the first switch plunger allowing the switch plunger to rise thereby activating the telephone, wherein the portion of the arm which covers the switch plunger has a partial depth hole which admits the first switch plunger when the arm is in its normal position whereby the depth of the hole is sufficiently shallow to allow the switch plunger to rise to the top of the hole without activating the telephone, thereby with the handset removed from the cradle preventing the arm from being moved horizontally unless the second switch plunger is manually fully depressed allowing the first switch plunger to drop out of the partial depth hole, said arm when released after the switch plunger has risen springs back tending towards its normal position coming to rest against the side of the switch plunger, and when the handset is returned to the cradle depressing the top of the switch plunger to the level of the arm, said arm as a result of the spring action riding up and over the beveled edge of the first switch plunger returning to its normal position thereby automatically re-engaging the guard.

* * * * *